March 28, 1933. T. S. MILLER ET AL 1,903,124
ROTARY GROUND WORKING IMPLEMENT
Filed May 17, 1932 6 Sheets-Sheet 4
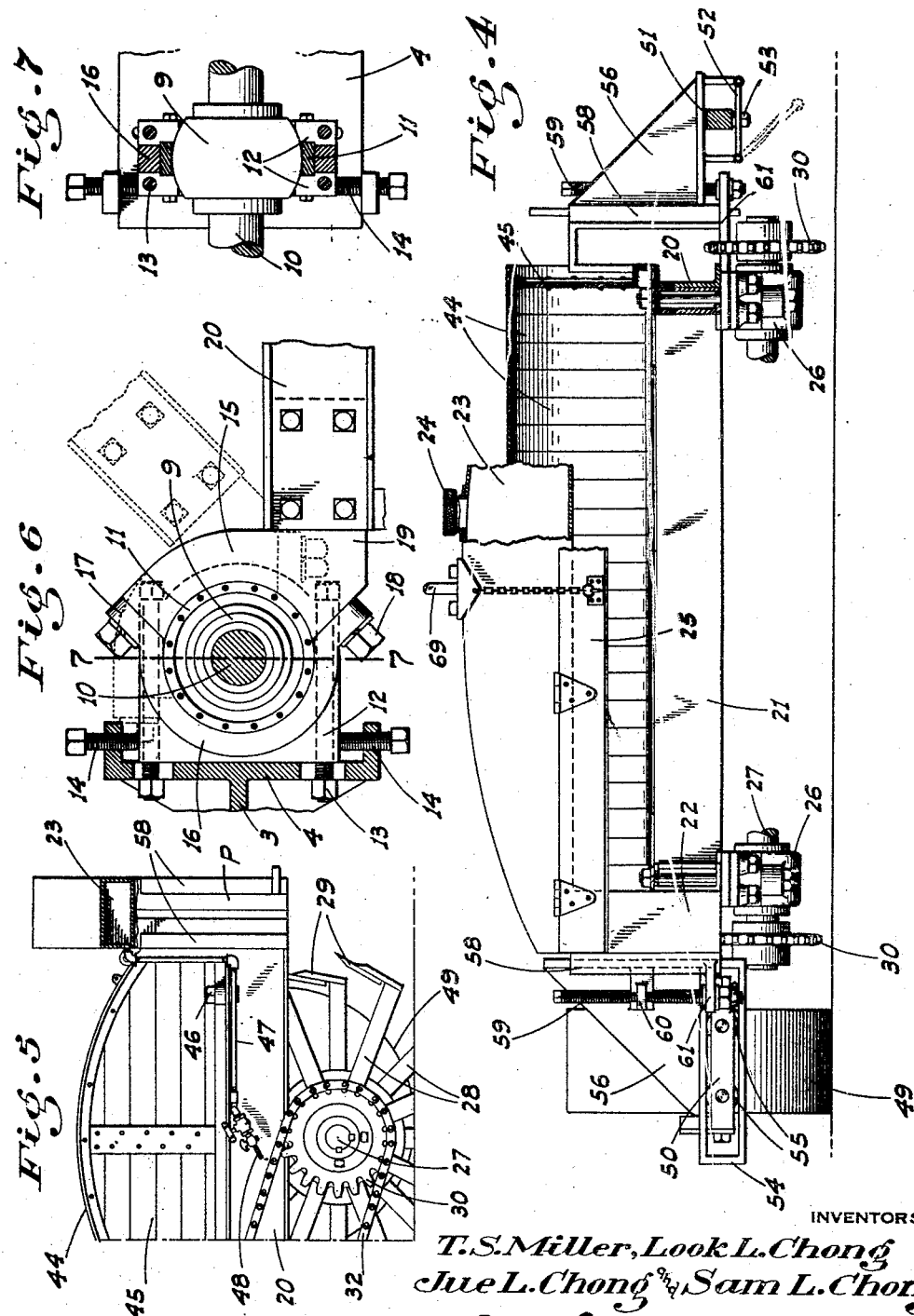
INVENTORS
T. S. Miller, Look L. Chong
Jue L. Chong & Sam L. Chong
BY [signature] ATTORNEY

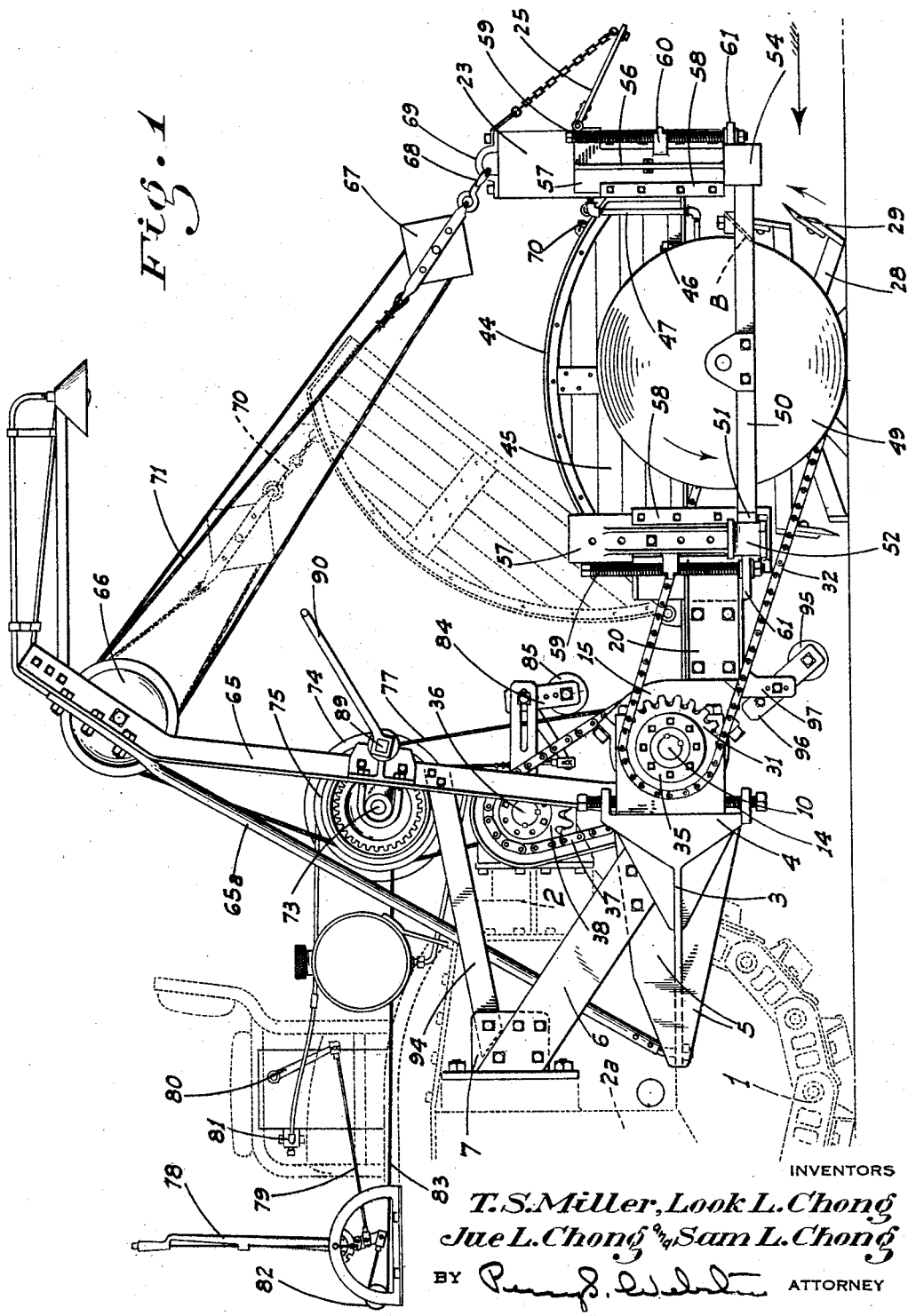

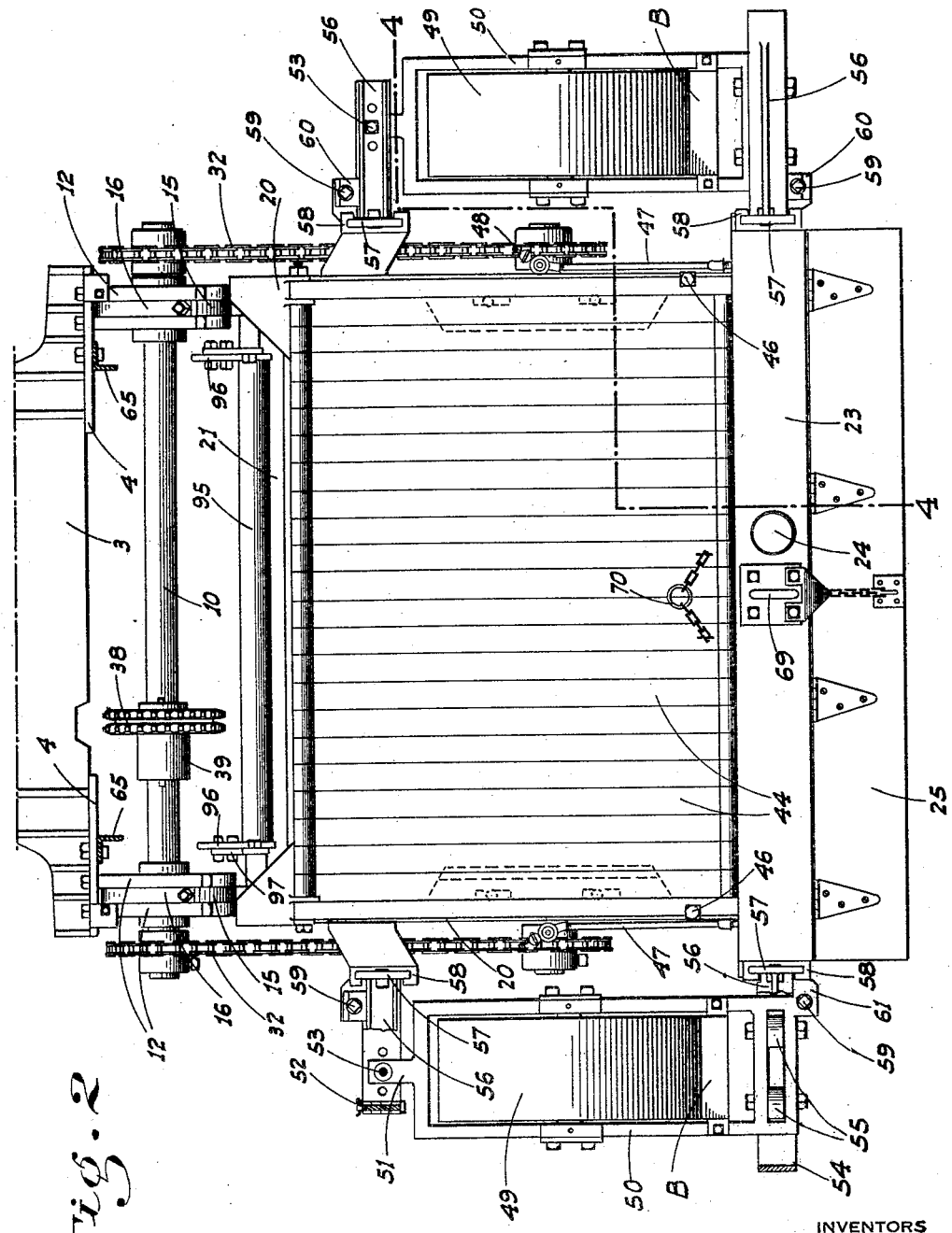

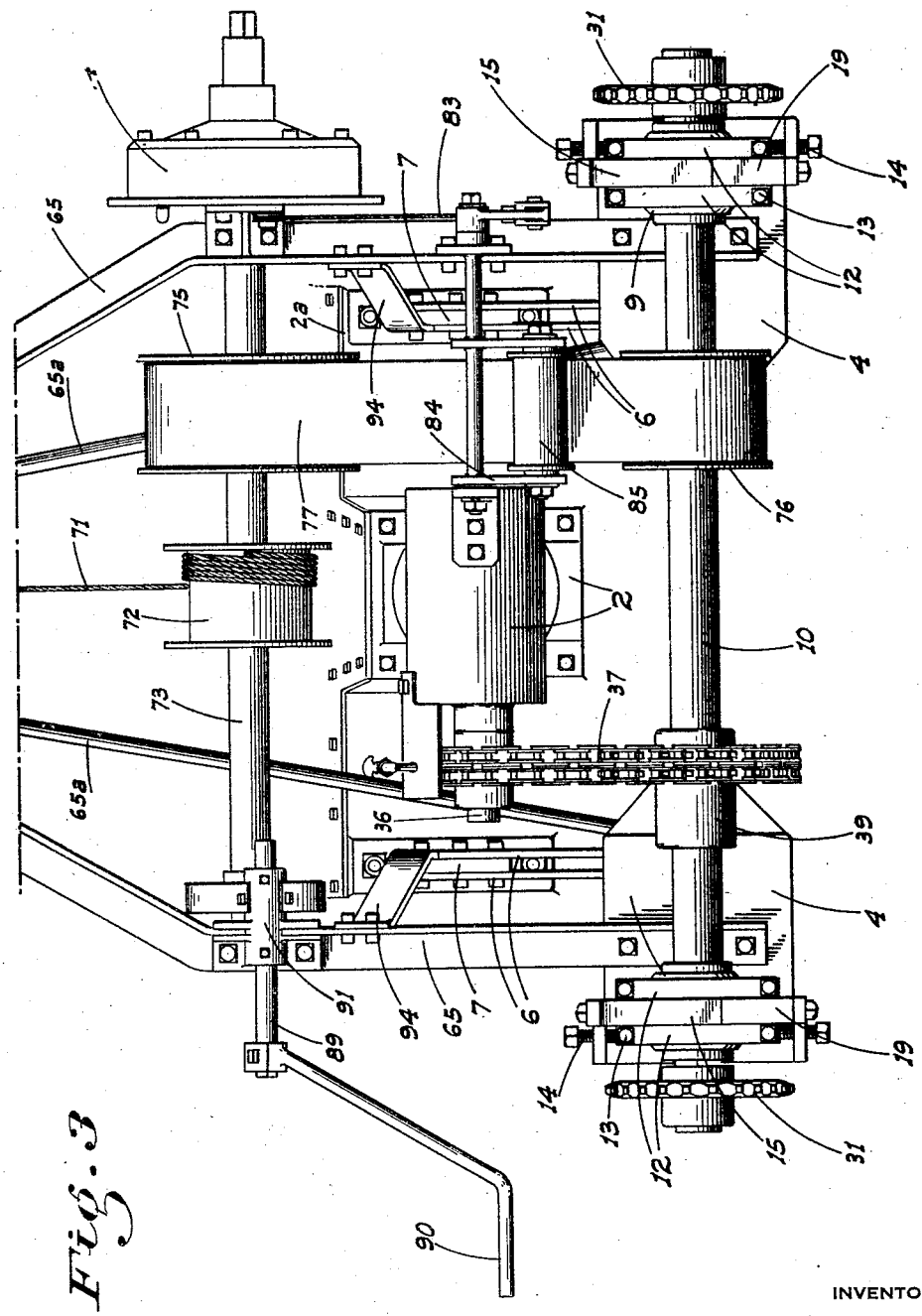

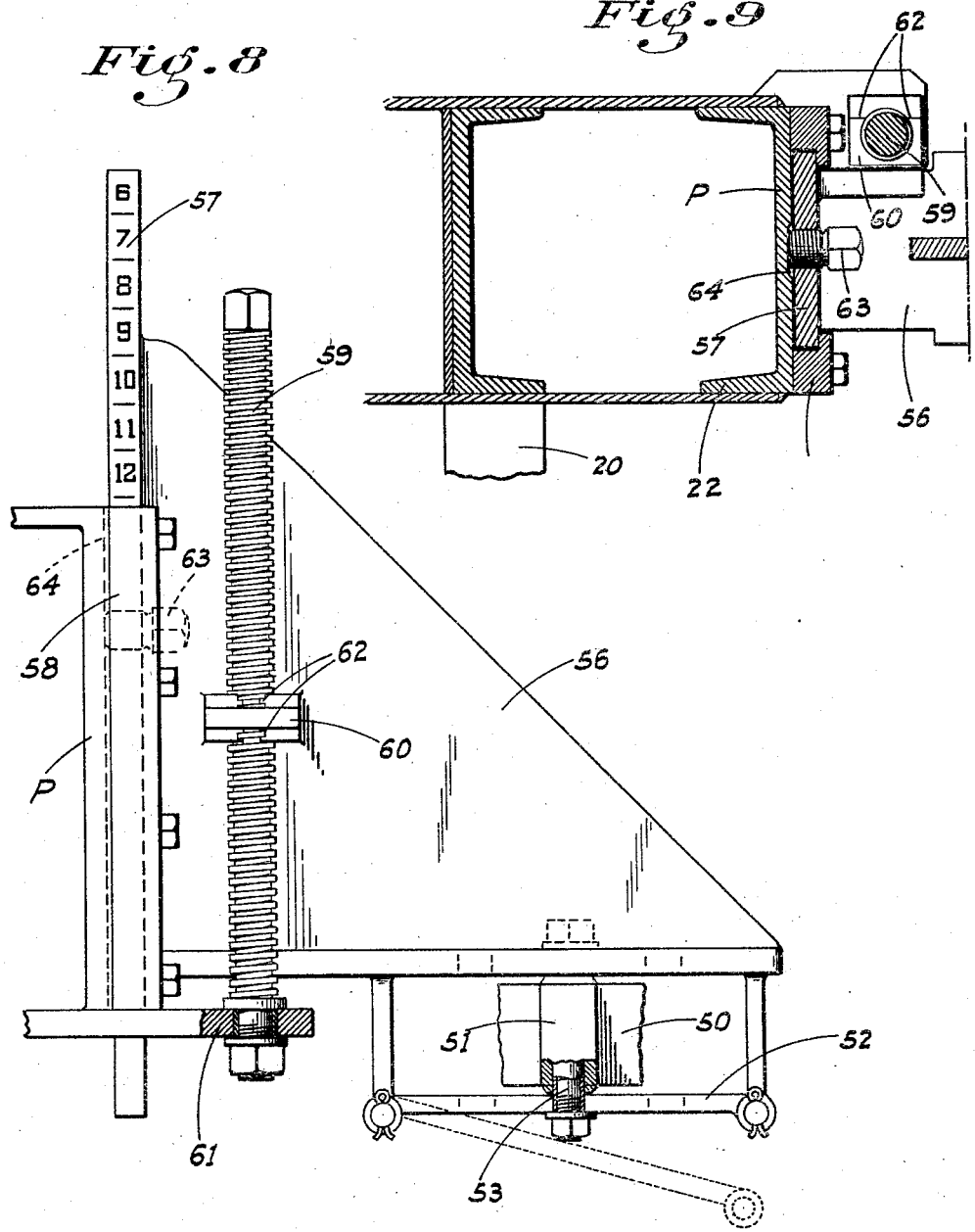

March 28, 1933. T. S. MILLER ET AL 1,903,124
ROTARY GROUND WORKING IMPLEMENT
Filed May 17, 1932 6 Sheets-Sheet 6
*Fig. 10*
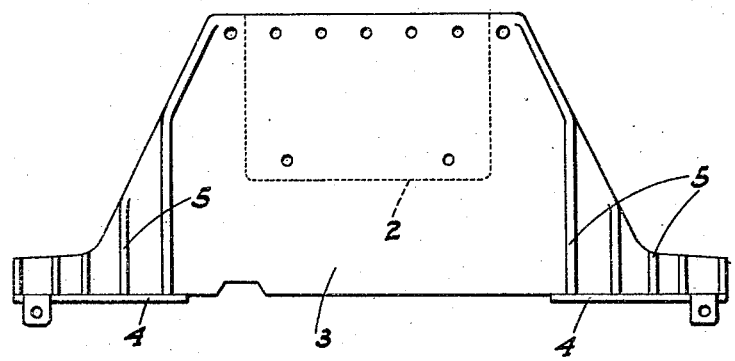
*Fig. 11* *Fig. 12* *Fig. 13*
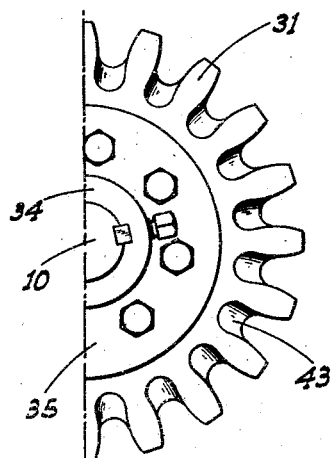 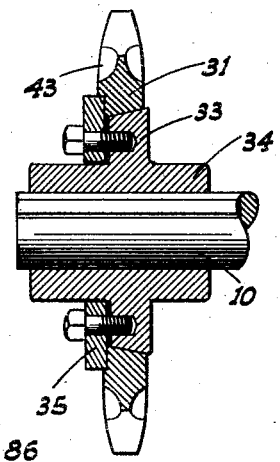 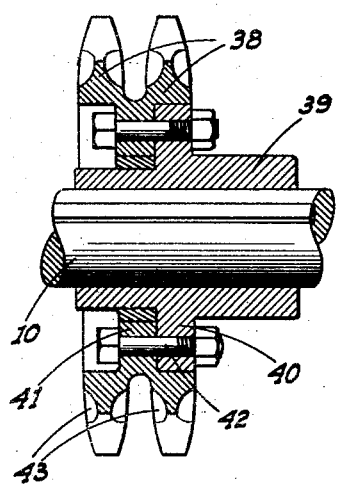
*Fig. 14*
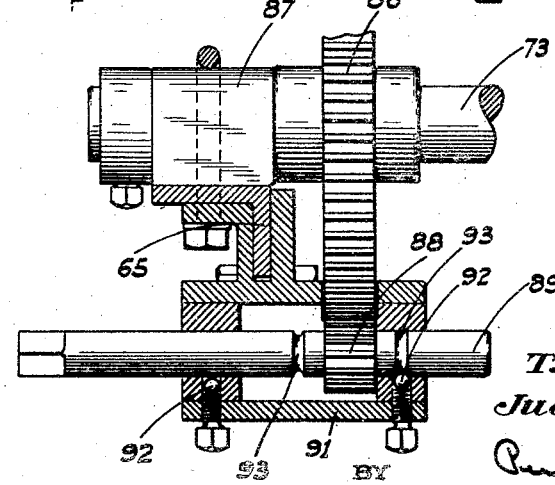
INVENTORS
T. S. Miller, Look L. Chong
Jue L. Chong & Sam L. Chong
ATTORNEY Patented Mar. 28, 1933

1,903,124

UNITED STATES PATENT OFFICE

TONY S. MILLER, LOOK L. CHONG, JUE L. CHONG, AND SAM L. CHONG, OF ISLETON, CALIFORNIA

ROTARY GROUND WORKING IMPLEMENT

Application filed May 17, 1932. Serial No. 611,840.

This invention relates to agricultural implements and especially to one of the rotary digging type of the character shown in Patent No. 1,816,210, dated July 28, 1931, and others of a like nature.

Such implements are especially designed to uproot and chop up asparagus plants after they have passed their period of profitable and quality production. The rotary digging unit is mounted in a frame which is attached to a tractor and is driven from the power plant of the tractor. Means is provided on the tractor to hoist the frame so that it may be raised clear of the ground for transportation and quick turning, as well as to allow the necessary frequent changing of the blades of the digging unit to be easily effected.

The present invention deals with the construction and arrangement of the mounting of the frame of the digging unit, and of the driving means for said unit. Our main objects are to provide a simple and yet substantial structure for detachably connecting the frame of the unit to the tractor; a combination and easily controlled power and hand operating hoist means for raising the frame; an improved adjustable device for adjustably supporting said frame at different levels relative to the ground regardless of the operation of the hoist; a novel form of hood for the digging unit so that the dirt may be easily disengaged from the same and sundry other features which will be apparent from a perusal of the following specification.

These objects we accomplish by means of such structure and relative arrangement of parts as will fully appear by a perusal of the following specification and claims.

In the drawings similar characters of reference indicate corresponding parts in the several views:

Fig. 1 is a side elevation of the complete apparatus with the digging unit in its operating position.

Fig. 2 is a top plan view of the unit.

Fig. 3 is a fragmentary transverse elevation of the frame supporting and hoisting structure.

Fig. 4 is a rear view of the frame and cooperating parts of the digging unit partly in section, as on the line 4—4 of Fig. 2.

Fig. 5 is a fragmentary side view of the digging unit and its frame partly in section and with the level maintaining roller removed.

Fig. 6 is a side view of a bearing unit for the drive sprocket shaft and the frame of the digging unit.

Fig. 7 is a transverse vertical section of the same on the line 7—7 of Fig. 6.

Fig. 8 is a front view of the front right hand supporting bracket for a level maintaining roller or wheel.

Fig. 9 is a fragmentary sectional plan of the rear bracket on the same side and the adjacent portion of the frame.

Fig. 10 is a top plan view of the main bracket plate and attachment to the tractor.

Fig. 11 is a partial side view of a self-cleaning and adjustable sprocket wheel.

Fig. 12 is a diametral section of the same.

Fig. 13 is a transverse section of a double sprocket wheel unit showing its shear bolt driving connection with the power shaft.

Fig. 14 is a plan view of the disengageable manually operated mechanism for the hoist with certain parts in section.

Referring now more particularly to the characters of reference on the drawings, the tractor to which the apparatus is attached comprises transversely spaced endless track units 1 having a rigid gear box housing 2 between the same in the rear end. Securely bolted to the under side of this housing and projecting rearwardly of the tractor a short distance is a heavy bracket plate 3 which is formed at its rear end with vertical flanges 4 and reinforced at transversely spaced intervals by vertical ribs 5 extending lengthwise of the tractor. This plate is held from possible sagging by diagonal bars 6 secured to certain ones of the ribs and to brackets 7 bolted against the lateral extensions 2a of the housing 2 at its front end.

Secured to the flanges 4 are supporting units for the transverse self-alining bearings 9 of standard character in which a transverse shaft 10 is journaled. Each unit comprises a band or ring 11 surrounding the bearing at its point of greatest diameter and engaging and securing to vertically split transversely spaced blocks 12, which engage and overhang the sides of the ring. The forward faces of the blocks are straight edged and abut against the rear face of the adjacent flange 4, to which said blocks are secured for vertical adjustment by bolts 13. Adjusting screws 14 mounted in connection with the flange engage the blocks at top and bottom so that their level may be altered and held at any desired position.

Turnably mounted on the ring between the blocks is a yoke comprising a main rear member 15 and a segmental strap 16 having end flanges 17 removably bolted to said main member. Both of the strap flanges normally extend at a rearward angle to the vertical diametral line of the bearing and the holding bolts 18 are correspondingly disposed at opposed forward angles as shown in Fig. 6. In this manner the yoke may turn from a normal position in either direction through a relatively large arc without the bolts 18 striking the flange 4 and enabling the latter to be kept close to the center line of the shaft and thus reducing the strain on the bolts of the supporting units. It is of course understood that there is one such yoke for each of the supporting units and the arrangement of said yokes relative to the bearings 9 allows the yokes to turn axially of the bearings without disturbing the latter or interfering with their self-alining movements; and any vertical adjustment of the shaft is necessarily accompanied by a similar movement of the yokes.

At their rear lower ends the main members 15 of the yokes are formed with rearwardly projecting extensions 19 which abut against and are rigidly secured to the forward ends of the side beams 20 of the digging unit frame. At their forward ends these beams are connected at the same level by a cross beam 21, but at their rear ends they are rigidly welded to upstanding posts 22 of rectangular box-like form, which project some distance above the beams 20. The posts support and are rigidly connected to the ends of a rigid hollow cross beam 23 which also forms an oil tank, access to which is had by means of a top filler 24.

The type and general dimensions and shape of this box beam tank are such that it forms a very rigid connection between the rear ends of the frame beams 20, preventing any warping of the same under any conditions. The relatively high position of the tank leaves an unobstructed opening at the back of the frame for the escape of dirt thrown rearwardly with the operation of the rotating digging unit mounted in the frame. A deflector board 25 is hingedly connected to the tank along its rear lower edge and extends rearwardly at a downward angle so as to deflect such dirt toward the ground.

Bolted to and under the beams 20 intermediate their ends are journal boxes 26 for the shaft 27 of the digging unit, which as in said aforementioned patent, includes a plurality of sets of radial arms 28 carrying digging blades 29 on their outer ends. Sprocket wheels 30 are fixed on the outer ends of the shaft 27 and are alined with similar sprocket wheels 31 mounted on the ends of the shaft 10, with chains 32 between corresponding pairs of sprockets, as shown in Fig. 2. One of the sprocket wheels 31 is in the form of a ring which is taper bored to engage the similarly sloping edge of a circular flange 33 formed on a hub 34 which is keyed to the shaft 10. The sprocket wheel at the small end of its bore overhangs the adjacent side of the flange. A ring 35 is mounted on the hub and abuts against said overhanging side of the sprocket wheel and is adjustably clamped to the flange by bolts therethrough. In this manner when the bolts are tightened up the ring 35 is pulled toward the flange and the sprocket wheel is wedgingly forced on to said flange so that it must turn therewith as a unit.

In this manner the said sprocket wheel may be initially adjusted and set relative to the opposite one so that the pull on both chains may be accurately equalized, thus eliminating the possibility of either shaft being strained by an unevenly distributed pull.

The shaft 10 is driven from the power take-off shaft 36 of the tractor by a double chain drive unit 37, said shaft 36 being as usual connected to the engine of the tractor with a manually controlled clutch unit therebetween. The rotary digger is thus driven by the rotation of the shaft 10. Since the digging blades sometimes strike a rigid obstruction underground which is apt to break the chain or other relatively expensive part which cannot always be replaced at short notice, we connect the lower sprocket 38 of the chain drive 37 to the shaft 10 in such a manner that the driving strains are taken by a pair of shear bolts which may be easily and cheaply replaced if fractured, and a spare supply of which can be easily carried in the tool box of the tractor.

Said sprocket wheel is therefore mounted as follows: Keyed on the shaft 10 is a sleeve 39 having a flange 40 projecting outwardly intermediate its ends. The double sprocket wheels are formed as a unit turnable on the flange and have a common ring-like web 41 which bears against the flange 40, so that the shear bolts 42 may be placed through the web and flange to hold the same together in driving relation.

All the sprocket wheels are provided on both sides and between their teeth at the bases of the same with curved inwardly extending recesses 43. In this manner the sprocket wheels between the teeth are somewhat narrower than the teeth themselves and the chain rollers which ride therebetween. The area of contact of the faces of said chain rollers and the sprocket wheels are so reduced at these points that the chances for dirt to become packed between the parts is minimized and any such dirt as may adhere to the wheels or chain rollers will be pushed into the recesses as the chain engages the wheel and will drop clear of the wheel. The latter is therefore self-cleaning and will not tend to clog up and pack with dirt as is the case with the ordinary form of sprocket wheel under similar working conditions.

Hingedly mounted at its forward end of the cross beam 21 is a hood to cover the upper portion of the rotating digger unit, said hood extending unbroken between the beam 21 and the rear ends of the beams 20 at the lower forward edge of the tank beam. The top of the hood comprises a number of separate longitudinally extending strips 44 of spring steel set very close together and suitably curved from end to end; while the sides of the hood comprise similar straight strips 45, all said strips being connected together at their ends so as to form a unitary structure without interfering with the resilient movement of the various strips relative to each other intermediate their ends.

This arrangement is of especial benefit in the servicing of the machine. In operation a considerable amount of dirt inevitably accumulates in and adheres to the hood and this dirt must be removed at intervals or it would otherwise interfere with the action of the digging unit. When the hood is rigid as is ordinarily the case said hood must be lifted and scraped out by hand, which as is well known to those who have used such implements is an arduous and awkward task to perform. By the use of the spring strips this raising of the hood is avoided since it is only necessary to strike the strips with a hammer or similar implement, whereupon the deflection and vibration of the strips, due to their resilient nature, causes the dirt to be automatically dislodged without further effort. Such dirt will then of course of itself drop to the ground. At the same time the hinged mounting of the hood enables it to be swung up when necessary, as when it is desired to inspect the digging unit. Such swinging movement of the hood is normally prevented by a releasable holding bolt arrangement, as shown at 46 between the hood and the beams 20 toward the rear end.

The tank 23 is for holding a supply of oil for the constant lubrication of the necessarily exposed chains and sprockets. Such lubrication is effected by means of forwardly extending gravity feed pipes 47 leading from the bottom of the tank at its sides and having valve control drip cocks 48 on their forward ends overhanging the chains 32 just ahead of the center line of the sprockets as shown in Fig. 5.

The level of the unit supporting frame relative to the ground and consequently the depth to which the rotary unit may dig is maintained by relatively large side wheels or rollers 49 journaled in surrounding yoke frames 50. Scraper blades B are mounted on said frames at the rear of the wheels to engage the rear faces of the same to keep them clear of dirt. At its forward end each frame 50 has a forwardly projecting ear or extension 51 which projects into a vertical transversely disposed yoke 52 and is pivotally secured thereto in different transverse positions by a vertical bolt or king pin 53. The bottom member of this yoke is hingedly mounted for lowering movement as shown in Fig. 8 so as to enable said extension 51 to be initially placed in position.

The rear end of the frame 50 projects into another rigid and relatively wide yoke 54 and carries transversely spaced rollers 55 engaging the top surface of the yoke and arranged so that said flange may have limited lateral shift movement with a minimum of friction. Both yokes depend from and are rigid with separate supporting brackets 56 which are substantial duplicates of each other. Each bracket is formed with a vertical back plate 57 slidably engaging vertical guide bars 58 supported in connection with the frame beams 20 adjacent their ends. The vertical adjustment and set position of each bracket is effected by means of a vertically adjustable screw 59 extending along one side of the bracket and threaded intermediate its ends through a boss 60 secured on said bracket. At its lower end said screw bears on a lug 61 rigid with the supporting frame. The outer edge of the boss is cut away at top and bottom sufficient to expose a portion of the adjacent periphery of the threads, as shown in Fig. 8.

This provides a self-cleaning feature for the screw since the edge of the cut away portion at the junction with the tapered bore of the boss acts as a scraper for any dirt which may have accumulated on the screw, and deflects such dirt outwardly and prevents it from being drawn up into the boss and ground between the cooperating threads to their detriment. One edge of the plate 57 is graduated in inches to read against the top of the adjacent guide bar, these graduations denoting the cutting depth of the rotary unit. Such depth may therefore be easily determined and the brackets adjusted to give any desired depth when such adjustments are being made. After the adjustments have been completed the brackets are clamped against the support by set screws 63 mounted in the back plates 57 and bearing against the bottom of shallow vertical grooves 64 formed in the supporting plate P of the guide bars between the latter. The purpose of the grooves is to prevent the burrs of metal which are inevitably gouged up by the bite of the heads of the set screws, from engaging the plates 57 and interfering with the easy sliding movement of the same. With the grooves any such small burrs of metal which may project and be subsequently broken off drop to the ground without interference and do not become jammed between any sliding parts.

The special mounting of the level maintaining wheels or rollers, as above described, enables the same to have a certain amount of lateral swinging movement so that they may independently yield to irregularities in their path of movement without tending to pull the rotary unit sideways. The axes of the rollers are vertically offset from the line of their supporting frames as clearly shown, so that inverting said frames will alter the height of the rollers from the ground regardless of any adjustment of the screws, as will be evident so that a great range of possible adjustment is afforded.

The rotary unit is raised so that the blades are entirely clear of the ground by the following means. Secured to and upstanding from the flanges 4 are transversely converging derrick arms 65 between which adjacent their upper ends a sheave block 66 of a block and tackle is supported. The arms are braced against rearward movement by bars 65a extending from the top of the arms to connections with the plate 3 adjacent its forward corners. The other block 67 of the tackle has a hook 68 to detachably engage an eye 69 formed on top of the tank 23, or a chain link 70 or the like on the hook 44 adjacent its rear end. A cable 71 passes about the sheaves of the block and tackle in the usual manner and then down to and about a drum 72. This drum is secured on a shaft 73 supported from the arms 65 in a horizontal plane substantially midway between the upper sheave block 66 and the shaft 10. A hydraulic brake unit 74 of standard character is mounted on one end of the shaft 73. A belt pulley 75 is mounted on the shaft 73 and another cooperating pulley 76 is on the shaft 10, with a normally slack belt 77 therebetween.

If the belt is tightened against the pulley therefore the shaft 73 will be rotated and the digging unit raised. If the belt is then allowed to run slack the unit will drop of its own weight. The raising of the unit and the subsequent lowering of the same at a controlled speed is controlled by the operator of the tractor in the following manner:

Pivoted intermediate its ends on the tractor in a position convenient to the operator is a vertical lever 78. A flexible element 79 extends rearwardly from the lower end of this lever and is connected to the operating arm 80 of the fluid control mechanism 81 of the hydraulic brake unit 74. This mechanism is of standard character as is the brake itself, and the arm 80 is arranged so that when pulled in one direction the fluid is fed to the brake unit and the brake is applied.

Projecting forwardly from the lower end of the lever and then about a fixed direction changing pulley 82 is another flexible element 83. This element at its rear end is applied to the pivoted supporting arm 84 of an idler 85 which bears against the belt 77 in such a manner that when said element 83 is pulled the idler will be advanced against the belt to place the same under tension and in driving relation with the pulleys 75 and 76. When the lever is pushed forwardly as in Fig. 15 therefore said element 83 is actuated to cause the drum shaft 73 to be driven and the unit raised, while the brake is released. Said idler pulley and belt arrangement is therefore practically a form of clutch. Disengaging the control clutch of the shaft 36 then enables the unit to be held raised as the lever is retained in its forward position and the belt held clamped against the pulleys.

When the lever is pushed back whether the shaft 36 is driven or not the idler will be released but the brake will be applied, with a force corresponding to the extent to which the lever is thus moved, and so allowing the unit to be lowered to its normal position gently and easily.

It may at times be desirable to raise the unit when the engine is not running so we provide an emergency hand operated means for rotating the shaft 73, as shown in Fig. 14. This means comprises a gear 86 fixed on the shaft 73 adjacent one of the end bearings 87 thereof, said bearings being secured against the forward face of the derrick arms 65. This gear engages a pinion 88 fixed on a hand shaft 89 provided at its outer end with a removable crank handle 90. The shaft 89 is slidably supported in the ends of a housing 91 in which the pinion is enclosed and which is clamped against the rear face of the adjacent arm 65, the gear projecting into the housing for engagement with the pinion. The length of the housing is sufficient to enable the pinion to be slid clear of the same by longitudinal movement of the shaft 89. It is normally held either in its engaged or disengaged position by spring pressed elements 92 mounted in the housing adjacent its ends to alternately engage circumferential grooves 93 in the shaft, said grooves being those always concealed between the ends of the housing and being thus free from exposure to the clogging action of dirt from the outside. Normally the pinion is retracted from the gear so that when the hoist is operated by power the pinion and handle of the shaft will not turn. To brace the derrick arms against possible deflection in the plane of the shaft 73 brace bars 94 extend from the arms 65 adjacent the bearings 87 to the brackets 7.

To flatten down tall weeds, asparagus stalks etc. ahead of the path of the rotary cutter so that such growths will be properly engaged and thoroughly chopped up by the cutter unit, we mount a transverse roller 95 a short distance ahead of the cutting unit. This roller extends for the full width of the unit and is supported from arms 96 adjustably mounted on brackets 97 depending from the forward ends of the frame 20.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. An earth working implement comprising a frame, a digging unit mounted therein, and a hood mounted on the frame over the upper portion of the unit; said hood comprising strips of resilient material disposed in close side by side relation.

2. An earth working implement comprising a supporting bracket, a frame pivotally connected to and projecting rearwardly from the bracket, a digging unit mounted in the frame, a hood over the unit supported by and pivotally mounted at its forward end on the frame, a hoist structure mounted on and upstanding from the bracket and including a depending cable and a hook associated therewith, and separate eyes for detachable engagement with the hook mounted on the rear end of the frame and hood.

3. A ground working attachment for a tractor comprising a horizontal bracket plate adapted to project under the rear-end gear box of the tractor, means to rigidly secure said plate to the box, a vertical flange along the rear edge of said plate, bearing supporting units secured to said flange in transversely alined and spaced relation, a frame projecting rearwardly from the plate, members on the forward end of the frame turnably engaging said units, a digging device mounted in the frame, and a hoist structure for lifting the frame mounted on the plate.

4. In an agricultural implement, a rotary digging unit, straight side frames supporting said unit, means mounting the frames at their front end for swinging movement in a vertical plane, a cross beam of rigid hollow box-like construction at and above the rear end of the frames and unit, rigid posts connecting the adjacent ends of the cross beam and frames, and hoisting means applied to the cross beam centrally of its length.

5. In an earth working implement, a frame for the digging unit of the implement, a supporting bracket, a shaft extending transversely of the frame, bearings for the shaft, supports for said bearings mounted on the bracket, said supports each comprising a ring about the corresponding bearing and blocks larger than the ring secured to the sides of the same and against the adjacent face of the bracket so that the ring is clear of the latter, and yokes secured to the adjacent end of the frame, each yoke turnably engaging a ring between the corresponding block.

6. A structure as in claim 5, in which each yoke is split and comprises a main member secured to the frame, and a strap separate from said member but cooperating therewith to completely surround the ring; and bolts securing the strap to said main member, the line of split of the yoke being disposed so that the heads of the bolts normally lie back of a line drawn through the axis of the shaft parallel to said adjacent face of the bracket.

7. An earth working implement comprising a frame, a digging unit mounted therein, ground-surface engaging wheels disposed to the sides of the frame, frames supporting said wheels, and means between the unit and wheel supporting frames for mounting the latter at both ends in connection with the unit frame for vertical adjustment relative thereto.

8. An earth working implement comprising a frame, a digging unit mounted therein, ground-surface engaging wheels disposed to the sides of the frame, frames supporting said wheels, vertical yokes mounted in connection with and projecting outwardly from the sides of the unit frame and into which the ends of the wheel frames project, vertical pivots connecting the forward yokes and the adjacent ends of the wheel frames, and antifriction bearing elements between the rear yokes and the adjacent ends of the wheel frames, the latter being arranged for limited lateral movement in the corresponding yokes.

9. An earth working implement comprising a frame, a digging unit mounted therein, ground-surface engaging wheels disposed to the sides of the frame, frames supporting said wheels, vertical yokes mounted in connection with and projecting outwardly from the sides of the unit frame and into which the ends of the wheel frames project, connecting means between the front yokes and the wheel frames, and means to adjust the yokes vertically.

10. An earth working implement comprising a frame, a digging unit mounted therein, ground-surface engaging wheels disposed to the sides of the frame, frames supporting said wheels, brackets above the ends of the wheel frames, means mounting said wheel frames in connection with the brackets, said brackets including a vertical back plate, guides engaging said plate and fixed in connection with the unit frame, and means between the brackets and unit frame for adjusting the brackets vertically relative to said frame.

11. A structure as in claim 10, in which said last named means comprises, for each bracket, a vertical screw, a boss on the side of the bracket through which the screw is threaded, and a lug fixed in connection with the unit frame supporting the lower end of the screw.

12. An earth working implement comprising a frame, a digging unit mounted therein, ground-surface engaging wheels disposed to the sides of the frame, frames supporting said wheels, brackets disposed above the ends of the wheel frames and mounted in connection with the unit frame, means mounting the wheel frames at one end in connection with the brackets for lateral swinging movement, and means supporting the wheel frames at the other end from the corresponding brackets in a manner to permit of such movement.

13. In an agricultural implement, a frame comprising side beams and a rigid cross beam at one end of the side beams, said cross beam being hollow and forming an oil tank, a transverse shaft to support a rotary digging unit journaled in connection with said side beams, sprocket wheels on the ends of said shaft, drive chains about said wheels, gravity feed oil pipes extending from the tank to points overhanging the sprocket wheels and chains, and drip cocks on the forward ends of said pipes.

14. An earth working implement comprising a frame, a digging unit mounted therein, and a hood mounted on the frame over the upper portion of the unit; said hood comprising a number of separate elements of resilient material whereby when struck on the outside it will yield inwardly to cause any dirt lodged therein to disadhere therefrom and drop.

15. A structure as in claim 4, in which said beam is enclosed at the ends to form a tank.

16. An earth working implement comprising a frame which includes side beams and a rear cross beam above said side beams, a hood on the beams over the upper portion of the unit and terminating at its rear end at the cross beam, and a dirt deflecting member supported from the rear face of the cross beam and disposed with a downward and rearward slope.

In testimony whereof we affix our signatures.

TONY S. MILLER.
LOOK L. CHONG.
JUE L. CHONG.
SAM L. CHONG.